United States Patent
Wilde

[11] Patent Number: 5,864,412
[45] Date of Patent: Jan. 26, 1999

[54] MULTIPHOTON PHOTOREFRACTIVE HOLOGRAPHIC RECORDING MEDIA

[75] Inventor: Jeffrey P. Wilde, Mountain View, Calif.

[73] Assignee: Seagate Technology, Inc., Scotts Valley, Calif.

[21] Appl. No.: 847,727

[22] Filed: Apr. 28, 1997

Related U.S. Application Data

[63] Continuation of Ser. No. 525,823, Sep. 8, 1995, Pat. No. 5,699,175.

[51] Int. Cl.$^6$ .................................................. G03H 1/02
[52] U.S. Cl. ...................................................... 359/7; 359/3
[58] Field of Search ............................... 359/3, 4, 7

[56] References Cited

U.S. PATENT DOCUMENTS

| | | | |
|---|---|---|---|
| 4,953,924 | 9/1990 | Redfield | 359/32 |
| 5,440,669 | 8/1995 | Rakuljic | 359/15 |
| 5,665,493 | 9/1997 | Bai et al. | 359/7 |
| 5,684,612 | 11/1997 | Wilde et al. | 359/7 |
| 5,698,344 | 12/1997 | Bai et al. | 359/7 |
| 5,699,175 | 12/1997 | Wilde | 359/7 |

*Primary Examiner*—Jon Henry
*Attorney, Agent, or Firm*—Blakely, Sokoloff, Taylor & Zafman LLP

[57] ABSTRACT

A multiphoton photorefractive holographic recording material includes an electro-optic host material doped with at least one lanthanide.

20 Claims, 4 Drawing Sheets

5,864,412

MULTIPHOTON PHOTOREFRACTIVE HOLOGRAPHIC RECORDING MEDIA

This is a continuation of application Ser. No. 08/525,823 filed Sep. 8, 1995, now U.S. Pat. No. 5,699,175.

TECHNICAL FIELD OF THE INVENTION

The present invention relates generally to materials for forming photorefractive holographic recording media. The invention relates in particular to a group of materials which are usable as non volatile multiphoton photorefractive holographic recording media.

DISCUSSION OF BACKGROUND ART

A photorefractive recording or storage medium or material functions by means of a photorefractive effect in the material. Typically information is recorded or stored in such a medium, using this photorefractive effect, in the form of a hologram. As such, photorefractive recording or storage media may be referred to as holographic storage media. The hologram is generated by incident electro-magnetic radiation, for example visible or infrared radiation, typically laser radiation, of a particular wavelength or frequency.

The photorefractive effect is based on a sequence of steps that include photoionization of localized trapping centers in the material by the incident radiation, and charge transport of resulting free carriers through the material by drift and diffusion. The trapping centers may originate from intrinsic defects or dopant impurities in the material. The free carriers are re-trapped so as to produce a space-charge electric field pattern along with a corresponding refractive index modulation that arises via an electro-optic effect. A detailed account of this photorefractive effect is provided in *Photorefractive Materials and Their Applications I*, (Springer-Verlag, 1989), ch. 1. Conventionally, the photorefractive effect utilizes single-photon or single-wavelength excitation of the material to achieve photoionization of the charge trapping centers.

For storage applications, promising single-photon photorefractive materials are based on a class of materials known as ferroelectric oxides. These materials are metal oxide host materials including intrinsic defects or, preferably dopants. Some of the earliest ferroelectric oxide materials include nominally undoped lithium niobate ($LiNbO_3$); iron-doped (Fe-doped) or manganese-doped (Mn-doped) $LiNbO_3$; Fe-doped lithium tantalate ($LiTaO_3$); iridium-doped (Ir-doped) or uranium-doped (U-doped) $LiNbO_3$; and Fe-doped or silicon-doped (Si-doped) $LiNbO_3$ or $LiTaO_3$. These materials are described respectively in U.S. Pat. No. 3,544,189, U.S. Pat. No. 3,915,549, U.S. Pat. No. 3,997,350, and U.S. Pat. No. 4,052,119. More recently, other single-photon recording materials such as cerium doped (Ce-doped) strontium barium niobate $Sr_xBa_{1-x}Nb_2O_6$ and undoped or rhodium-doped (Rh-doped) barium titanate ($BaTiO_3$) have been developed.

Typically, holographically stored information is read from the holographic storage medium using radiation of the same wavelength as that used to record the information. In a single-photon photorefractive recording medium this will usually result in erasure of the recorded hologram during readout, unless some type of fixing process, such as thermal ionic fixing, is employed following recording. This is a significant disadvantage of single-photon holographic recording media. In addition, most of the ferroelectric oxide photorefractive materials are not sensitive in the near infrared.

For holographic storage applications, the above discussed disadvantages of single photon recording media may be overcome by using media which take advantage of a multiphoton photorefractive effect. Multiphoton absorption or excitation is a well-known process in which two or more photons of the same or different energies (wavelength or frequency) are absorbed by a material, thereby placing the material in a higher energy configuration. With regard to multiphoton photorefractive recording, the photons involved in the multiphoton excitation step are ideally of at least two different wavelengths.

In general, depending on the properties of the host/dopant combination providing the multiphoton absorbing material, the higher energy states of a dopant may or may not be strongly coupled to a particular host in such a way that charge transfer can occur between the dopant and the host. However, the photorefractive effect, whether arising from a single-photon or multiphoton absorption process, requires a charge transfer to take place during recording and erasure; the charge transfer is also referred to as photoionization. This means that at least one dopant species must act as a charge trapping center for electrons or holes. A portion of the trapping centers are filled while the remainder are empty. Holographic recording and erasure then occur through light-induced charge redistribution among the trapping centers during photoexcitation.

Early efforts to pursue holographic recording applications based on the two-photon photorefractive effect were hindered by a lack of a suitably efficient recording material, i.e., host/dopant combination. Initial work by von der Linde et al. (Appl. Phys. Lett. 25, p. 155, 1974) centered on $LiNbO_3$ doped with transition metal ions $Fe^{3+}$, $Fe^{2+}$, and $Cu^{2+}$. Experimental results, using very high peak intensity picosecond pulses in the range of $1 \times 10^8$ to $5 \times 10^8$ Watts/cm² ($W/cm^2$), indicated that the dopants had little or no effect on observed two-photon absorption and corresponding hologram formation. The high-intensity two-photon recording process was attributed to an intrinsic, but otherwise unspecified, property of the $LiNbO_3$ host crystal itself. Intrinsic multiphoton absorption and electron excitation from the "homogeneous host material rather than from a dopant" is also taught in U.S. Pat. No. 3,922,061. Two-step photorefractive recording at relatively high intensity, for example about $10^9$ $W/cm^2$ has also been demonstrated in Fe-doped $LiTaO_3$ (H. Vormann and E. Kratzig, Solid State Commun. 49, p. 843, 1984).

From an applications point of view, the utility of multiphoton holographic recording increases dramatically as the optical intensity requirements decrease, for the simple reason that low-intensity lasers are more readily available, less expensive, and generally more compact than high-intensity laser systems.

Two-photon recording at reduced intensity has been demonstrated in chromium-doped $Cr^{3+}$-doped lithium niobate $LiNbO_3$ and $LiTaO_3$ (D. von der Linde et al., J. Appl. Phys. 47, p. 217, 1976). However, the $Cr^{3+}$-doped material was found to have a dark storage time of only about 20 hours, which is not considered useful for most storage applications.

It is believed that less-than-ideal results in multiphoton recording experiments discussed above are due in large part to relatively short lifetimes of intermediate excited states of dopant ions, for example, less than about five-hundred nanoseconds (500 ns) for $Cr^{3+}$-doped $LiNbO_3$. It is believed that substantially improved multiphoton recording is to be expected with doping schemes that provide longer-lived intermediate excited states.

SUMMARY OF THE INVENTION

The present invention is directed to providing new photorefractive materials for multiphoton holographic recording that are not subject to above-discussed shortcomings of the prior art, such as volatile readout (erasure on readout), short dark-storage time, and inefficient two-photon absorption.

In one aspect of the present invention, a multiphoton holographic storage medium comprises a host material which is doped with at least one lanthanide dopant material.

The lanthanide materials (lanthanides) are a group of rare-elements having atomic numbers fifty-eight through seventy-one (58 through 71), i.e., the group of elements consisting of cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu), in order of increasing atomic number.

The lanthanide dopant material or combination of dopant materials provides multiphoton absorption, which may involve an energy transfer process. The multiphoton absorption leads to photoionization and subsequent hologram formation via charge transport and re-trapping.

Preferably, the host material is selected from a group of ferroelectric materials consisting of, lithium niobate, barium titanate, and potassium tantalate niobate, or from a group of materials having a tungsten bronze crystalline structue, for example, the group consisting of strontium barium niobate, and barium strontium potassium sodium niobate. The lanthanide dopant material is preferably selected from the group consisting of Pr, Sm, Eu, Tb, and Yb. In addition, the lanthanide dopant material (ion) preferably possesses two valence states, one thereof corresponding to a filled electron trap and the other to an empty electron trap.

The host medium is preferably selected from the class of ferroelectric materials because ferroelectrics typically possess large electro-optic effects and can often be readily doped with a wide range of impurities. In the present invention, at least two of the photons involved in the photoexcitation process preferably have sufficiently different wavelengths that nonvolatile readout can be accomplished by reconstructing (reading out) with one wavelength in the absence of the other wavelengths. In addition, a proper selection of the dopant(s) can allow for holographic recording in the near infrared, thereby yielding a distinct advantage over prior art photorefractive recording materials.

According to the present invention the preferred mode of accomplishing charge transfer for multiphoton holographic recording is by promotion of an electron from a ground 4f quantum state of a lanthanide dopant material, via an intermediate metastable quantum state of the lanthanide dopant material, to an upper excited 5d quantum state of the lanthanide dopant material. This promotion may be accomplished using a combination of host material and dopant which will provide one of three general energy level configurations therein. One configuration corresponds to single-species doping, the other two correspond to dual-species doping.

In the single-species case, efficient multiphoton recording is obtained, in part, by having a long-lived or metastable intermediate state that can be readily excited into a higher energy level or set of levels. The higher levels then couple to the host medium to produce charge transfer (i.e., photoionization of an electron into the conduction band or a hole into the valence band).

In the two cases of dual-species doping, energy transfer from one species of dopant to a second species of dopant is used to reach the uppermost energy levels of the second dopant. The second species of dopant then participates in the charge transfer process and subsequent photorefractive space-charge redistribution. The energy transfer process, occurring in the form of discrete energy packets, can connect real excited states of the two dopants, or alternatively, it can proceed in a photon-assisted fashion if the second species dopant does not possess a real intermediate excited state.

In one dual-species-doped embodiment of the present invention, a multiphoton photorefractive holographic recording material comprises a host material doped with first and second lanthanide dopant materials. Holographic recording results from charge transfer from the dopant materials to the host material.

The charge transfer is accomplished by promotion of an electron from a ground 4f quantum state of the second lanthanide dopant material, via an intermediate metastable 4f quantum state of the second lanthanide dopant material, to an upper excited 5d quantum state of the second lanthanide dopant material. The electron promotion is accomplished by absorption of a first photon of light energy by the first lanthanide dopant material, and transfer of at least part of the energy of the first photon to the second lanthanide dopant material, thereby promoting the electron in the ground 4f quantum state thereof to the metastable intermediate 4f quantum state thereof. Absorption of a second photon of light energy by the second lanthanide dopant material further promotes the promoted electron from the metastable intermediate 4f quantum state of the second lanthanide dopant material to the upper excited 5d quantum state thereof.

In another dual-species-doped embodiment of a multiphoton photorefractive holographic recording material in accordance with the present invention, including a host material doped with first and second lanthanide dopant materials, and wherein holographic recording results from charge transfer from the dopant materials to the host material, the charge transfer is accomplished by promotion of an electron from a ground 4f quantum state of the second lanthanide dopant material directly to an upper excited 5d quantum state of the lanthanide dopant material.

The electron promotion is accomplished by absorption of a first photon of light energy by the first lanthanide dopant material, transfer of at least part of the energy of the first photon to the second lanthanide dopant material, and absorption of a second photon of light energy by the second lanthanide dopant material.

In both of the last-discussed embodiments the first and second photons may have the same or different wavelengths.

Materials of the current invention are ideally suitable for holographic data storage with nonvolatile readout and for the fabrication of holographic spectral filters that operate in the near infrared. Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

The present invention focuses on the photoionization step in the photorefractive effect and provides new dopant schemes for achieving multiphoton photorefractive recording. The new dopant schemes involve lanthanide dopant materials.

In a preferred embodiment of the present invention, host materials are doped with one or more lanthanide dopant materials (ions) such that multiphoton absorption produces excitation of at least one dopant ion from its ground state to a higher energy level. An excitation pathway can involve either real or virtual intermediate energy states, or a combination of the two. Two distinctly different types of multiphoton excitation, termed here as direct and indirect, are possible.

During direct multiphoton excitation, an ion of interest is promoted to the higher energy configuration by direct absorption of two or more photons. Of particular significance in the present invention is direct two-photon absorption via a real metastable intermediate state, a process which may also be referred to as resonant two-step absorption. In contrast, indirect multiphoton excitation involves, during at least one step in the process, the promotion of one species of ion (termed an activator) to a higher energy configuration by energy transfer from a neighboring ion of a different species (termed a sensitizer). Therefore, indirect multiphoton excitation involves doping with at least two species of photoactive ions to provide a means for energy transfer. Additional steps in the excitation of the activator (i.e., quantum mechanical energy transitions) can arise from photon absorption by the activator.

Figure 1:
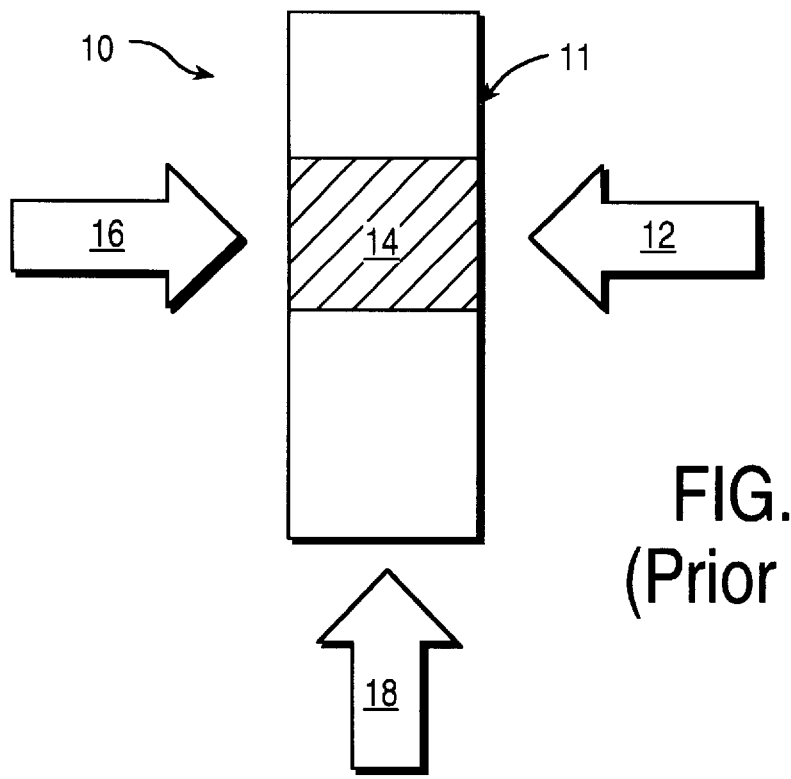
FIG. 1 schematically illustrates a generic two-photon photorefractive holographic recording arrangement according to established principles, including a pump beam, a reference beam, an object beam, and a photorefractive holographic recording medium.

Referring now to FIG. 1, a general two-photon recording arrangement 10, according to established principles, utilizes a recording material or medium 11 and a pump beam 12 of wavelength $\lambda_1$. A region 14 of material 11, illuminated by pump beam 12, spatially defines an active region which becomes photosensitive to an object beam 16 and reference beam 18, both having wavelength $\lambda_2$. Recording and erasure at wavelength $\lambda_2$ can only occur in the presence of pump beam 12 at $\lambda_1$.

Wavelengths $\lambda_1$ and $\lambda_2$ are preferably provided by relatively low intensity laser beams, formed by focused continuous wave (CW) lasers. A low intensity beam is here exemplified as a beam having an intensity less than about $10^7$ W/cm$^2$.

A photorefractive holographic recording material includes a host material including one or more dopants. In order for a multiphoton photorefractive holographic recording material to be effective at such relatively low intensity, careful consideration has been given to criteria for the dopant or combination of dopants that provide the necessary trapping centers for photorefractive holographic recording.

One important criterion is that the holographic recording material contain both filled and empty traps. Maximum dynamic recording is achieved when the relative concentrations of filled and empty traps are about equal. Dopant ions in the material should exist in more than one valence state in order to provide both filled and empty traps. In a crystalline host material, associated ground states of the dopant ions should lie within the band gap of the host material. The relative concentrations of the valence states may be controlled during or after fabrication of the recording material, by controlling oxidizing or reducing properties of atmosphere surrounding the material during growth or during post-growth treatment while the material is at an elevated temperature, for example greater than about five-hundred degrees centigrade (500° C.).

It is believed that another, particularly important, criterion is that the filled traps in a multiphoton photorefractive holographic recording material should possess at least one metastable intermediate energy level having a relatively long excited-state lifetime, preferably between about $10^{-6}$ to $10^{-2}$ seconds. In this regard in particular, the present invention is directed to the use of lanthanide materials as dopant materials for a multiphoton photorefractive holographic recording material. Ions of the lanthanides have relatively long excited state lifetimes and can satisfy both of the above-discussed criteria. Specific schemes for their implementation in multiphoton photorefractive holographic recording material in accordance with the present invention, as well as aspects related to the choice of a host material are discussed in detail hereinbelow.

While the majority of the subsequent discussion centers on two-photon photorefractive recording, the ideas set forth can be readily extended, by those skilled in the art to which the present invention pertains, to a more general case of multiphoton recording using more than two photons. It is pointed out here that two-photon recording does not necessarily imply two-wavelength recording. Rather, "two-photon" simply refers to the fact that absorption of two individual photons (one for reaching an intermediate state, and another to achieve photoionization from the intermediate state) is involved in the creation of a free charge carrier. Therefore, pump beam 12 and object and reference beams 16 and 18 may contain many discrete wavelengths or a continuum of wavelengths.

As discussed above, a most important aspect of the photorefractive holographic recording medium of the present invention is the incorporation of rare earth ions in a ferroelectric or other suitable electro-optic host material. Rare earth ions in solids are known for certain unique spectral properties, perhaps foremost being the extreme sharpness of several absorption and emission lines. Lanthanide rare earth ions, when incorporated into solid materials, are most often found to have valence states between +2 and +4 with an electronic configuration given by $4f^n 5s^2 5p^6$ (the number of f-shell electrons, n, depends on the atomic number of the ion and its valence state). Almost all of the sharp absorption and emission lines are due to transitions within the manifold of the 4f electrons. The 4f electrons are not the outermost ones and are shielded from the surroundings by two other electronic shells, the 5s and 5p, which have larger radial extensions. Therefore, the 4f states are only weakly perturbed by the host material, which accounts for the sharp character of the lines. However, the perturbation by the host material is often sufficient to mix states of different parity into the 4f states, thereby allowing $4f \to 4f$ electric dipole transitions that are otherwise forbidden by the parity selection rule. This interpretation explains the relatively low oscillator strengths as well as the very long lifetimes of the $4f \to 4f$ transitions. It is also important to note that a few $4f \to 4f$ magnetic dipole transitions exist and are not forbidden by the parity selection rule. These transitions are much weaker than allowed electric dipole transitions, but they can have oscillator strengths comparable to, if not much larger, than many of the observed "forbidden" electric dipole transitions.

The next excited-state electronic configuration of the lanthanides is $4f^{n-1} 5s^2 5p^6$ 5d. The $4f^n \to 4f^{n-1} 5d$ electric dipole transitions are not forbidden by the parity selection rule and can therefore lead to strong optical absorption. For the case of trivalent rare earth ions in solids, the $4f \to 5d$ transitions (here 4f denotes the ground state 4f configuration) typically lie in the ultraviolet. Some rare earth elements such as Eu, Sm, and Yb can also exist in a divalent state, in which case the $4f \to 5d$ transitions lie in the visible and mask the weaker $4f \to 4f$ transitions. The 5d states strongly couple to the host material and can therefore participate in a charge transfer process.

A key aspect of a multiphoton photorefractive holographic recording medium in accordance with the present invention is that rare earth dopants incorporated in a host material provide a means whereby an electron of the dopant material (ion) may be promoted from a 4f ground state into an upper excited 5d state via a long-lived intermediate 4f state. This aspect is illustrated in equation form as:

$$|4f^n\rangle \to |4f^n\rangle^* \to |4f^{n-1}5d\rangle^* \to CT \quad (1)$$

where $|4f^n\rangle$ is the ground state of the dopant, $|4f^n\rangle^*$ is the intermediate excited state of the dopant (as a result of absorbing a first photon), $|4f^{n-1}5d\rangle^*$ is the upper excited state, and CT indicates charge transfer to the host material resulting from the electron promotion process.

The rare earth doping concentration required to observe a photorefractive effect in a photorefractive holographic recording material in accordance with the present invention can be expected to lie approximately in a concentration range from about 0.01 to 3.0 mole %, depending on which host material, dopant, and charge transfer (transition) scheme is selected.

When dealing with $4f \to 4f$ rare earth transitions, dopant concentrations toward the larger end of this concentration range can be used, and, in fact, may be required to offset weak absorption. However, the degree to which the dopant concentration can be increased depends on how the dopant is incorporated into the host and what effect doping has on the optical quality of the material. Following an initial selection of a host material and dopant(s) according to guidelines set forth hereinbelow, an optimum doping concentration for a particular application or configuration can then be determined through systematic materials characterization.

Figure 2:
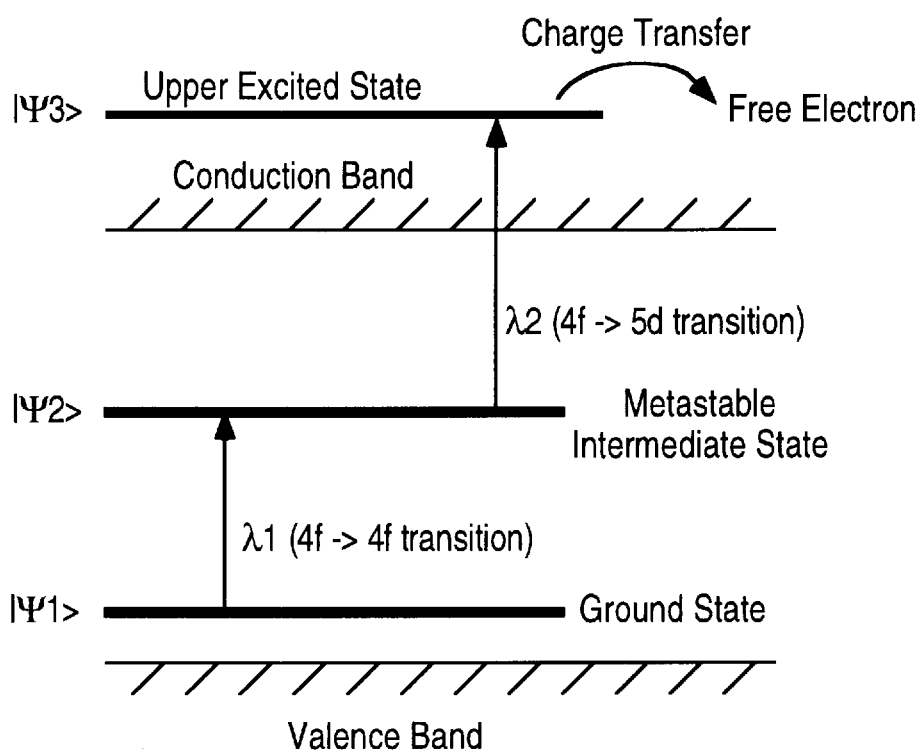
FIG. 2 is a general energy level diagram schematically illustrating a charge transfer process for a photorefractive holographic recording medium in accordance with the present invention including a single-species rare earth dopant suitable for two-photon photorefractive recording.

Continuing now with reference to FIG. 2, charge transfer schemes for a photorefractive holographic recording material doped with a single rare earth species in accordance with the present invention are described. One such scheme provides an energy level configuration, as shown in FIG. 2, that is particularly amenable to two-photon photorefractive recording. The energy levels in FIG. 2 are identified by quantum states denoted $|\Psi 1\rangle$, $|\Psi 2\rangle$, and $|\Psi 3\rangle$, a notation which is shorthand for a more rigorous representation of the quantum state by four independent quantum numbers S, L, J, and M. These quantum numbers correspond, respectively, to the spin, the orbital angular momentum, the total angular momentum, and the component of J along a specified Cartesian axis (typically taken to be the z axis). Normally in a rigorous treatment, in order to observe quantization effects related to M, there must be some way of defining the z axis in space, such as by the application of an external magnetic field. Since no such method of defining the z axis is necessary in the present invention, however, such a rigorous treatment can be ignored and each energy level can be completely characterized by the three quantum numbers S, L, and J such that $|\Psi 1\rangle = |S_1, L_1, J_1\rangle$, $|\Psi 2\rangle = |S_2, L_2, J_2\rangle$, and $|\Psi 3\rangle = |S_3, L_3, J_3\rangle$. This simplifies functional analysis of the materials of the present invention.

Also in a rigorous analysis there exist well-known selection rules that require $\Delta S = 0$; $\Delta L = 0, +1$ or $-1$; and $\Delta J = 0, +1$, or $-1$, where prefix $\Delta$ denotes the difference in corresponding quantum numbers. These selection rules apply strictly to free atoms and ions, however. When the atoms and ions are incorporated into a solid host, their quantum states are perturbed by the surrounding environment in such a way that not only can the parity selection rule be violated, but so can the other selection rules. Certain transitions which are "forbidden" by rigorous application of the above discussed selection rules are possible and observed in photorefractive holographic recording materials in accordance with the present invention.

The degree to which the selection rules are violated for a particular dopant/host combination are best determined experimentally. It is noteworthy that the observed "forbidden" transitions are typically associated with the creation of excited states having characteristically long lifetimes, a key feature of the present invention. A long-lived intermediate state, or metastable state, is advantageous because the rate at which transitions occur from this state to the second, higher-energy excited state is linearly proportional to the intermediate state lifetime. In general, a metastable intermediate state leads to more efficient two-photon photorefractive recording, with lower optical intensity requirements compared to a short-lived intermediate state.

FIG. 2 specifically illustrates the photoionization process for a rare earth ion acting as a filled electron trap. The host material in FIG. 2 is assumed to be a ferroelectric crystal. The metastable intermediate state $|\Psi 2\rangle$ is populated by illuminating the material with radiation (photons) of wavelength $\lambda_1$ which falls within the absorption band of the metastable state. The single rare earth species doping approach of FIG. 2 therefore centers on direct excitation of the metastable intermediate state through resonant or near-resonant absorption involving a $4f \to 4f$ transition. Photoionization then takes place by exciting a $4f \to 5d$ transition with radiation (photons) of wavelength λ2 which, through coupling between the 5d state of the rare earth ion and the host crystal, leads to the creation of a free electron in the conduction band. An analogous situation exists for the production of a free hole, in which case the rare earth ion has a valence state corresponding to an empty electron trap and a hole is photoionized from the metastable intermediate state. It is pointed out here that only the case of electron photoionization from filled electron traps is illustrated in FIG. 2, and in FIGS. 3, 4, 5, and 6, which illustrate other doping or charge transfer schemes in accordance with the present invention. In all of these schemes, however, hole photoionization may take place from empty electron traps in a similar fashion.

Figure 3:
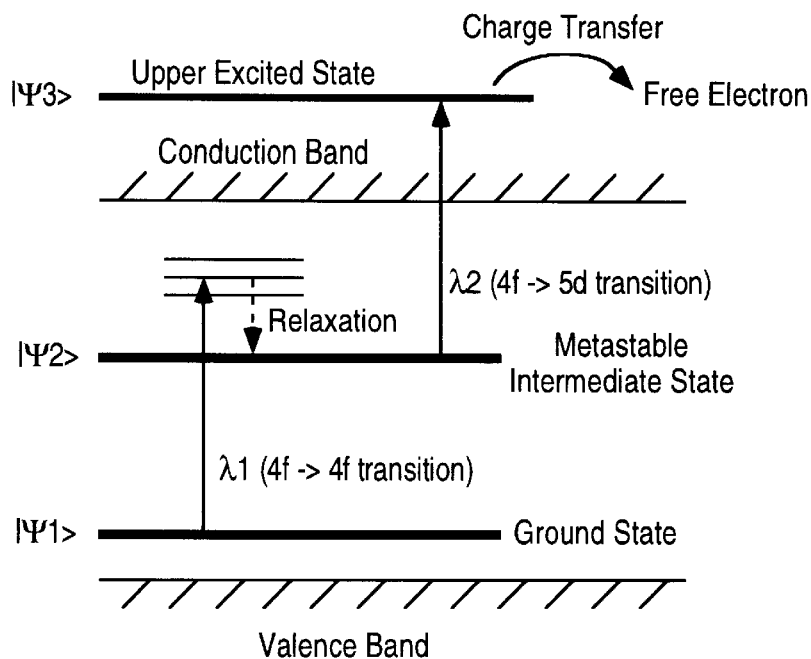
FIG. 3 is a general energy level diagram schematically illustrating another charge transfer process for a photorefractive holographic recording medium in accordance with the present invention including a single-species rare earth dopant.

Referring now to FIG. 3, a metastable intermediate state may also be populated by exciting a higher-energy intermediate state |Ψ2>* (with radiation of wavelength $\lambda_1^*$) which then relaxes, i.e., loses energy either radiatively or non-radiatively, to the desired metastable intermediate level |Ψ2>. In general, the pumping radiation can be broadband or can contain multiple wavelengths so that more than one discrete intermediate state or a continuum of intermediate states can be simultaneously excited. Those states lying above |Ψ2> then relax to |Ψ2>. Moreover, excitation into intermediate states lying above |Ψ2> is not restricted to 4f→4f transitions and may include 4f→5d transitions as long as any photoionization that might also occur be sufficiently small so as not to preclude hologram recording.

Photorefractive hologram recording takes place at wavelength $\lambda_2$ during or shortly after illumination with the pumping radiation at wavelength $\lambda_1$ (or $\lambda_1^*$). For example, when using pulsed radiation for both pumping and recording, the object and reference recording pulses can arrive at the sample simultaneously with the pumping pulse, or they can be delayed with respect to the pumping pulse by a time duration no greater than the lifetime of the metastable intermediate state. This same constraint applies to the erasure radiation, although the erasure radiation need not derive from the same source as the recording radiation.

Table 1 contains a partial list of candidate lanthanide ions any one of which is useful in single-species doping in two-photon photorefractive holographic recording material in accordance with the present invention.

The various energy levels in Table 1 are given in conventional Russell-Sanders term notation ($^{2S+1}L_J$). Listed are the ground state |Ψ1>, some possible intermediate states |Ψ2>* (including |Ψ2>, the metastable intermediate state), along with the corresponding approximate excitation wavelengths $\lambda_1^*$ and an approximate lifetime τ in milliseconds (ms) of the metastable intermediate state. The case of resonant or near-resonant excitation of the metastable intermediate state (FIG. 2) occurs when |Ψ2>*=|Ψ2> and $\lambda_1^*$= $\lambda_1$.

It should be noted here that wavelengths listed in Table 2 are wavelengths which would be required for pump beam 12 of FIG. 1 and are primarily visible wavelengths. Wavelengths for object beam 16 lie in a range from about 400 to 1500 nm a range. These wavelengths may readily be determined from sample materials, for example, by means of two-photon spectroscopy using a monochromator in conjunction with a high-intensity light source such as an arc lamp for each of two tuneable sources.

Figure 4:
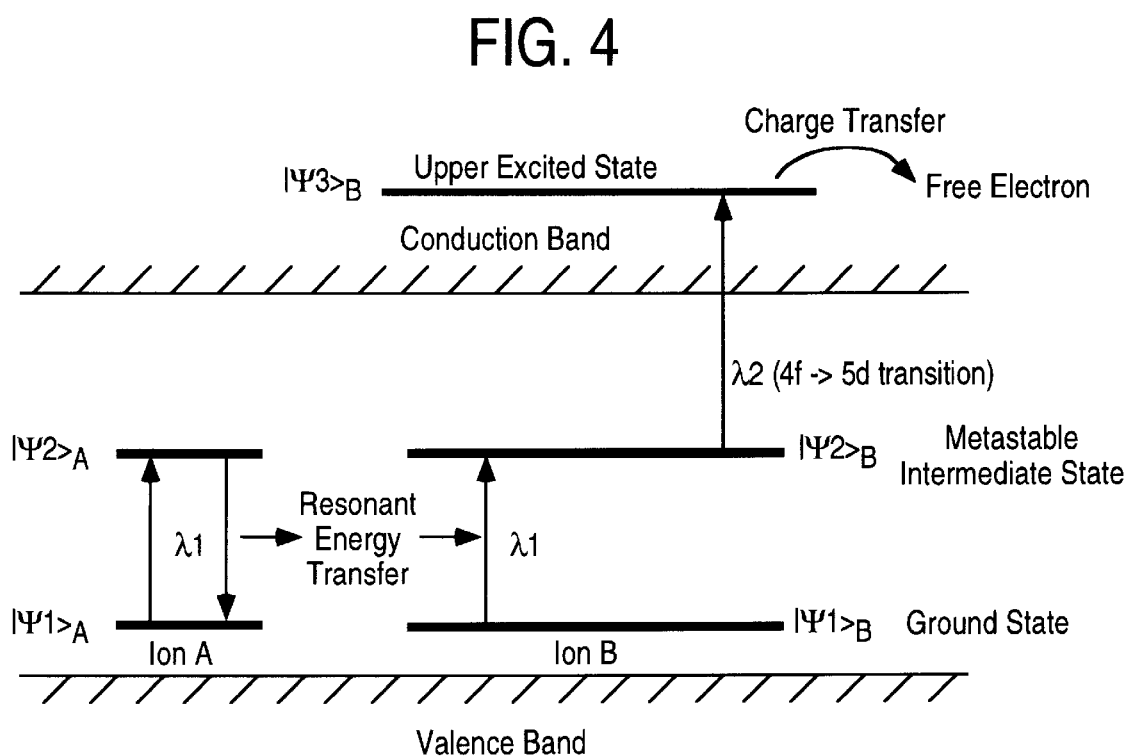
FIG. 4 is a general energy level diagram schematically illustrating a two-photon charge transfer process for a photorefractive holographic recording medium in accordance with the present invention including two species of rare earth dopants.
Figure 5:
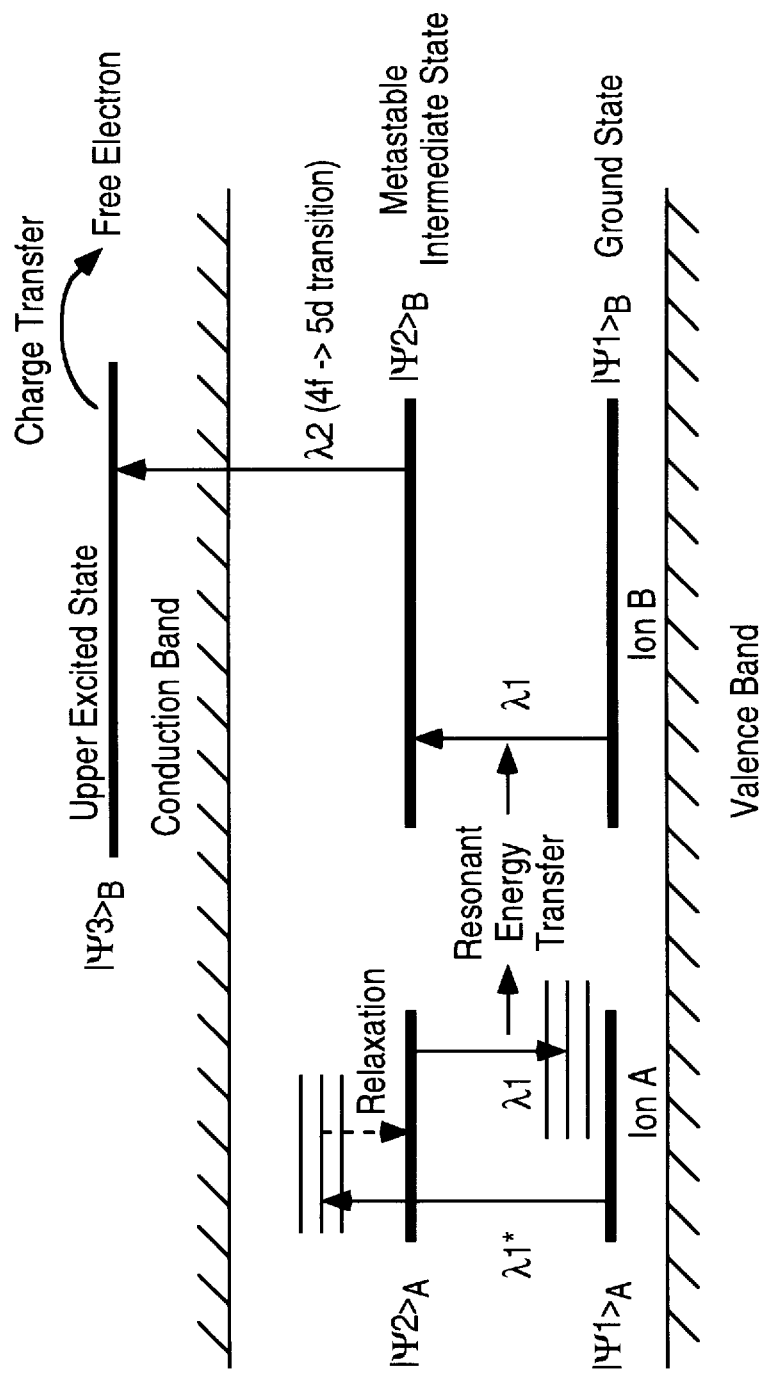
FIG. 5 is a general energy level diagram schematically illustrating another two-photon charge transfer process for a photorefractive holographic recording medium in accordance with the present invention including two species of rare earth dopants.
Figure 6:
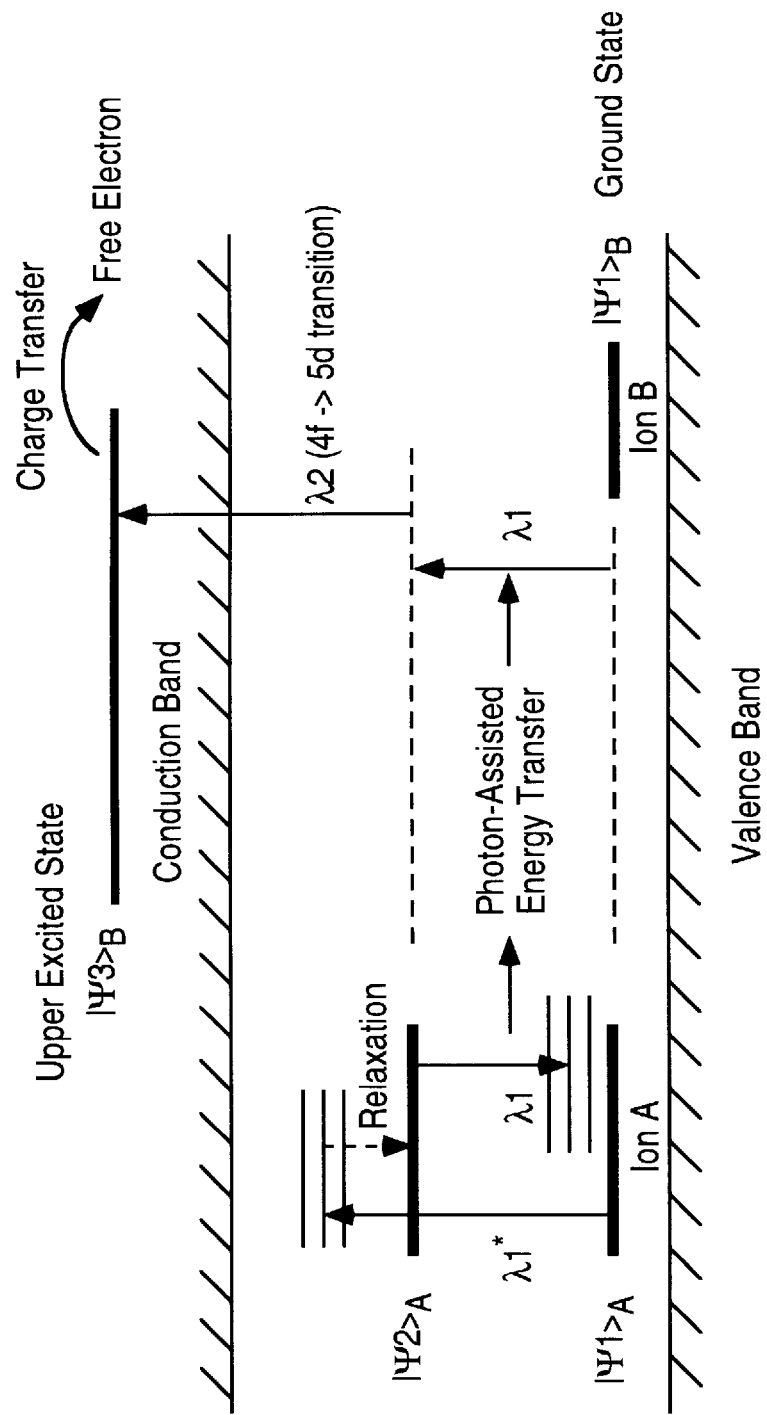
FIG. 6 is a general energy level diagram schematically illustrating yet another two-photon charge transfer process for a photorefractive holographic recording medium in accordance with the present invention including two species of rare earth dopants.

Continuing now with reference to FIGS. 4, 5, and 6, charge transfer schemes for a photorefractive holographic recording material doped with two different rare earth species in accordance with the present invention are described. These schemes may be referred to as dual-species doping schemes. In these schemes, energy contained in the excited state of one type of dopant ion (the sensitizer) is transferred to a second type of dopant ion (the activator, assumed to be a rare earth ion) in order to facilitate charge transfer. So, for example, absorption of a photon by the sensitizer and transfer of this energy to the activator can be considered to constitute the first step of a two-photon photoionization process.

This dual-species doping technique is most useful when the intermediate excited state of the second type of ion is more efficiently populated by energy transfer than by direct absorption of a photon. For dual-species doping, preferred combinations of lanthanide dopant materials are Pr/Sm, Pr/Eu, Eu/Tb, and Yb/Pr.

In a multiphoton photorefractive holographic recording material in accordance with the present invention, multiphoton photorefractive recording can be made to occur in a dual-species doped material, even though the requisite

TABLE 1

| Ion | |Ψ1> | |Ψ2>* | $\lambda_1^*$ (nm) | |Ψ2> | τ (ms) |
|---|---|---|---|---|---|
| $Pr^{3+}$ | $^3H_4$ | $^1I_6$ | 470 | $^3P_0$ | 0.01 |
|  |  | $^3P_1$ | 475 |  |  |
|  |  | $^3P_0$ | 490 |  |  |
|  |  | $^1D_2$ | 600 | $^1D_2$ | 0.2 |
|  |  | $^3P_0$ | 475 |  |  |
| $Sm^{3+}$ | $^6H_{5/2}$ | $^4G_{5/2}$ | 560 | $^4G_{5/2}$ | 1.0 |
|  |  | $^4F_{3/2}$ | 530 |  |  |
|  |  | $^4G_{7/2}$ | 500 |  |  |
| $Sm^{2+}$ | $^7F_0$ | $^5D_2$ | 575 | $^5D_0$ | 1.0 |
|  |  | $^5D_1$ | 630 |  |  |
|  |  | $^5D_0$ | 690 |  |  |
| $Eu^{3+}$ | $^7F_0$ | $^5D_2$ | 465 | $^5D_0$ | 1.0 |
|  |  | $^5D_1$ | 526 |  |  |
|  |  | $^5D_0$ | 579 |  |  |
| $Tb^{3+}$ | $^7F_6$ | $^5D_4$ | 488 | $^5D_4$ | 1.3 |
|  |  | $^5D_3$ | 381 |  |  | energy level structure does not exist for direct multiphoton excitation of either species individually, or if it does exist, is simply too inefficient. It is pointed out here that while suitable dopant species pairs are identified in the discussion presented above, and others will be evident to those skilled in the pertinent art from consideration of the principles set forth in this discussion, that careful selection of the dopant concentrations is needed for the energy transfer processes to work most efficiently. In practice, the optimum concentrations can be determined by means of a systematic experimental parametric study.

The following description of dual-species doped photorefractive holographic recording materials in accordance with the present invention is presented in terms of two energy transfer processes. These processes are generally termed resonant (or near-resonant) energy transfer, and photon-assisted energy transfer. Those skilled in the pertinent art will recognize that other energy transfer mechanisms may be used in similar ways to achieve the same general results.

Referring now to FIG. 4, a transition scheme is presented wherein energy is transferred from the excited state of Ion A (the sensitizer) to Ion B (the activator), placing Ion B in a metastable intermediate state. If the transitions |Ψ2>$_A$→|Ψ1>$_A$ and |Ψ1>$_B$→|Ψ2>$_B$ have the same energy, then the interaction is considered resonant; otherwise, the energy differential may be compensated for by the absorption or emission of phonons, i.e., the process is phonon-assisted, in which case the energy transfer still proceeds but is termed near-resonant. When phonon absorption is required, the temperature of the host material must be sufficient to provide the necessary reservoir of phonons throughout the material. In most cases, however, room temperature is sufficient, and the process only becomes non-operative at relatively low temperatures, for example less than about seventy-seven degrees Kelvin (77° K.). By way of contrast, when phonon emission is involved, this temperature constraint does not apply.

Continuing with reference to FIG. 4, once Ion B reaches the intermediate state $|\Psi 2>_B$, it can be promoted to the second excited state $|\Psi 3>_B$ (subsequently leading to charge transfer) through direct photon absorption. For example, the $^2F_{5/2}$ excited state in $Yb^{3+}$ can transfer energy to the $^1G_4$ level of $Pr^{3+}$, thereby populating this intermediate level and allowing for further excitation into the 5d levels of $Pr^{3+}$.

It is important to note that above-discussed selection rules also apply to resonant or near-resonant energy transfer. For example, when considering the case of energy transfer between two different types of rare earth lanthanide ions, the parity selection rule is satisfied if the difference in the number of 4f-shell electrons between the two ions equals plus or minus an odd integer. For example, such is the case with $Yb^{3+}$ and $Pr^{3+}$.

Referring now to FIG. 5, a more general scheme of resonant or near-resonant energy transfer is presented. In this scheme excitation of the activator (Ion A) can take place with a photon of wavelength $\lambda_1^*$ which has a higher energy than the transition associated with the energy transfer step. As with the direct multiphoton absorption process illustrated in FIG. 3, excitation of Ion A may occur to any of a plurality of levels above the intermediate state $|\Psi 2>_A$. Relaxation to $|\Psi 2>_A$ then occurs, followed by energy transfer to Ion B (producing state $|\Psi 2>_B$), leaving Ion A either in the ground state or in any of a plurality of states located above the ground state.

Yet another energy transfer scheme is depicted in FIG. 6. In this scheme, the excited state of Ion A does not transfer its energy to a real intermediate state of Ion B. Instead, Ion A gives up its energy in such a way that when combined with the simultaneous absorption of a photon having the proper energy, the net energy is sufficient to excite Ion B directly into the upper state, leading to charge transfer. This cooperative transfer phenomenon is referred to as photon-assisted energy transfer. It is utilized when an ion with the desired photorefractive properties is identified, e.g., an ion which may readily exhibit two valence states, thereby allowing for the proper combination of filled and empty traps, but for which no suitable intermediate excited states exist to provide for direct multiphoton absorption.

The foregoing discussion has concentrated on energy schemes and criteria for selection of rare earth dopants for a photorefractive holographic recording material in accordance with the present invention. The discussion continues with a description of criteria for selection of suitable host materials for selected dopants.

The basic properties required of a host material for multiphoton photorefractive recording are similar to those needed for conventional single-photon recording. When dealing with a crystalline host, the crystal lattice of the host should be able to accommodate the dopant or dopants of interest, either by substitution for lattice ions or in interstitial locations. Specifically, the host material should be an electro-optic material which provides a large polarization-optic coefficient $f_{eff}$ given by $$f_{eff} = r_{eff}/\epsilon\epsilon_0 \qquad (2)$$

where $r_{eff}$ is the effective linear electro-optic coefficient, $\epsilon$ is the relative static dielectric constant, and $\epsilon_0$ is the free-space permittivity. Generally, $f_{eff}$ should be no smaller than about 0.02 square meters per coulomb ($m^2/C$).

The doped host material should also provide a high photorefractive sensitivity (defined as the refractive index change per absorbed unit energy) and large dynamic range (maximum photorefractive index change) when used in real-time applications such as read/write data storage; although for other applications such as holographic spectral filtering, the photorefractive sensitivity is not as critical. Material physics that determine the sensitivity and dynamic range are thoroughly documented in scientific literature, for example in *Photorefractive Materials and Their Applications I,* Springer-Verlag, 1989.

Ferroelectric oxides materials satisfy most of the above discussed host requirements. Typical ferroelectric materials that are suitable for use in this invention include lithium niobate ($LiNbO_3$), barium titanate ($BaTiO_3$), potassium tantalate niobate (KTN), and materials having a tungsten bronze crystal structure such as strontium barium niobate (SBN), barium strontium potassium sodium niobate (BSKNN). Doped single crystals of these ferroelectric oxides may be grown by any suitable established method, for example, Czochralski, Bridgman, laser-heated pedestal growth, or top-seeded solution growth.

For substitutional doping, the following criteria are important. The relative ionic radii in Ångstrom units (Å.U.) of the dopant ion or ions and the lattice ions that are being displaced should ideally be similar in value. The ionic radii of the rare earth lanthanide ions are given in Tables 2 and 3. It can be seen that their values are generally in the range from 1.0–1.2 Å.U.. Table 4 lists the ionic radii (Å.U.) of the various ferroelectric constituent ions.

TABLE 2

| Valence | Ce | Pr | Nd | Pm | Sm | Eu | Gd |
|---------|------|------|------|------|------|------|------|
| 2+ | 1.24 | 1.23 | 1.21 | 1.20 | 1.18 | 1.17 | 1.16 |
| 3+ | 1.02 | 1.00 | 0.99 | 0.98 | 0.97 | 0.97 | 0.97 |

TABLE 3

| Valence | Tb | Dy | Ho | Er | Tm | Yb |
|---------|------|------|------|------|------|------|
| 2+ | 1.14 | 1.13 | 1.11 | 1.10 | 1.08 | 1.07 |
| 3+ | 1.00 | 0.99 | 0.97 | 0.96 | 0.95 | 0.94 |

Considering these substitutional doping criteria and data presented in Tables 2, 3 and 4, it can be seen for example that ferroelectrics comprising $Sr^{2+}$ and/or $Ba^{2+}$ (such as SBN or BSKNN) are particularly well-suited for rare earth doping. However, this does not imply that other materials such as $LiNbO_3$ can not be adequately doped with one or more of the rare earths to provide a multiphoton photorefractive holographic recording material.

It should be emphasized here that while energy transfer processes have been described above in terms of a crystalline host material, the host material need not be a ferroelectric single crystal. It may also be a polycrystalline, electro-optic, ceramic material such as lead lanthanum zirconate titanate (($Pb_{1-x}$, $La_x$)($Zr_y$,$Ti_z$)$O_3$ or PLZT), or an amorphous material such as an electro-optic photorefractive polymer.

TABLE 4

| Ion | Radius (Å.U.) |
|---|---|
| $Li^+$ | 0.60 |
| $Nb^{5+}$ | 0.70 |
| $Sr^{5+}$ | 1.13 |
| $Ba^{2+}$ | 1.35 |
| $Ti^{4+}$ | 0.68 |
| $Na^+$ | 0.95 |
| $K^+$ | 1.33 |

By way of example, one family of such polymers is based on poly-(N-vinylcarbazole) (PVK) light sensitized by addition of 2,4,7,-trinitro-9-fluorenone (TNF), and provided with electro-optic properties by addition of an azo dye 2,5-dimethyl-4-(p-nitrophenylazo)anisole (DMNPAA).

Generally the host material may be any material which can be doped with one or more lanthanide materials and which exhibits an electro-optic effect. As such, it can reasonably be expected that a single-species or dual-species doping scheme can be employed in a wide variety of host materials. Some materials, of course will prove more advantageous than others depending on criteria such as ease and cost of material fabrication, electro-optic properties, the manner in which the dopant enters the host material, and the desired optical quality of the recording material. In this regard, two different ferroelectric crystal materials, $LiNbO_3$, and SBN are preferred as host materials for multiphoton photorefractive holographic recording medium in accordance with the present invention.

On the one hand, based on ionic radii considerations, SBN is better suited than $LiNbO_3$ for incorporation of the lanthanides. In addition SBN has larger electro-optic coefficients than $LiNbO_3$. However, SBN is much more difficult and costly to grow with high optical quality compared to $LiNbO_3$, primarily due its very high melting temperature (about 1500° C.), highly anisotropic growth kinetics, and strong tendency to striation formation. On the other hand $LiNbO_3$ is a commonly available electro-optic crystal that can be readily grown with a very high optical quality.

The present invention has been described and depicted in terms of a preferred and other embodiments. The invention, however, is not limited to the embodiments described and depicted. Rather, the invention is defined by the claims appended hereto.

What is claimed is:

1. A holographic recording material, comprising:
a two-photon and higher photorefractive electro-optic host material, said host material doped with {at least one} first and second lanthanide dopant materials, wherein said first and second lanthanide dopant materials are different species.

2. The holographic recording material of claim 1 wherein concentration of said lanthanide dopant materials is between about 0.01 and 3.0 mole percent.

3. The holographic recording material of claim 1 wherein at least on of said lanthanide dopant materials has two different valences.

4. The holographic recording material of claim 1 wherein said first and second lanthanide dopant materials are selected from a group of lanthanide materials consisting of praseodymium, samarium, europium, terbium, and ytterbium.

5. The holographic recording material of claim 1 wherein said host material has a tungsten bronze crystalline structure.

6. The holographic recording material of claim 5 wherein said host material is one of strontium barium niobate, and barium strontium potassium sodium niobate.

7. The holographic recording material of claim 1 wherein said host material is a ferroelectric material.

8. The holographic recording material of claim 7 wherein said host material is selected from the group of ferroelectric materials comprising lithium niobate, barium titanate, and potassium tantalate niobate.

9. A holographic recording material, comprising:
a two-photon and higher photorefractive electro-optic host material doped with first and second lanthanide dopant materials for charge transfer from said dopant materials to said host material, wherein said first and second lanthanide dopant materials are different species;

said charge transfer being accomplished by promotion of an electron from said ground 4f quantum state of said second lanthanide dopant material, via said intermediate metastable 4f quantum state of said second lanthanide dopant material, to an upper excited 5d quantum state of said second lanthanide dopant material; and said electron promotion being accomplished by absorption of a first photon of light energy by said first lanthanide dopant material, transfer of at least part of said energy of said first photon to said second lanthanide dopant material, thereby promoting said electron in said ground 4f quantum state thereof to a metastable intermediate 4f quantum state thereof, and absorption of a second photon of light energy by said second lanthanide dopant material, thereby further promoting said promoted electron from said metastable intermediate 4f quantum state of said second lanthanide dopant material to said upper excited 5d quantum state thereof.

10. The holographic recording material of claim 9 wherein said first and second photons have different wavelengths.

11. The holographic recording material of claim 9 wherein said first and second photons have the same wavelength.

12. A holographic recording material, comprising:
a two-photon and higher photorefractive electro-optic host material doped with first and second lanthanide dopant materials for charge transfer from said dopant materials to said host material, wherein said first and second lanthanide dopant materials are different species;

said charge transfer being accomplished by promotion of an electron from said ground 4f quantum state of said second lanthanide dopant material to an upper excited 5d quantum state of said second lanthanide dopant material; and said electron promotion being accomplished by absorption of a first photon of light energy by said first lanthanide dopant material, transfer of at least part of said energy of said first photon to said second lanthanide dopant material, and absorption of a second photon of light energy by said second lanthanide dopant material.

13. The holographic recording material of claim 12 wherein said first and second photons have different wavelengths.

14. The holographic recording material of claim 12 wherein said first and second photons have the same wavelength.

15. A holographic recording process comprising:

exposing a host material with a first photon;

exposing said host material with a second photon; and transferring a charge from said dopant materials to said host material, wherein said host material is a two-photon and higher photorefractive electro-optic host material doped with first and second lanthanide dopant materials, wherein said first and second lanthanide dopant materials are different species, wherein said first lanthanide dopant material absorbs said first photon and transfers at least part of the energy of said first photon to said second lanthanide dopant material, wherein said second lanthanide dopant material absorbs said at least part of the energy of said first photon transferred from said first lanthanide dopant material and said second lanthanide dopant material absorbs said second photon causing the promotion of an electron from said ground 4f quantum state of said second lanthanide dopant material to an upper excited 5d quantum state of said second lanthanide dopant material and then transferring the charge from said second lanthanide dopant to said host material.

16. The holographic recording material of claim 15 wherein said first and second photons have different wavelengths.

17. The holographic recording material of claim 15 wherein said first and second photons have the same wavelength.

18. A process of recording a hologram in a two-photon and higher photorefractive electro-optic host material doped with first and second lanthanide dopant materials, comprising:

exposing a host material with a first photon, said first lanthanide dopant material absorbing said first photon and transferring at least part of the energy of said first photon to said second lanthanide dopant material;

exposing said host material with a second photon, said second lanthanide dopant material absorbing said at least part of the energy of said first photon transferred from said first lanthanide dopant material and said second lanthanide dopant material absorbing said second photon causing the promotion of an electron from said ground 4f quantum state of said second lanthanide dopant material to an upper excited 5d quantum state of said second lanthanide dopant material; and transferring a charge from said dopant materials to said host material, said charge being transferred from said 5d quantum state of said second lanthanide dopant material to said host material.

19. The holographic recording material of claim 18 wherein said first and second photons have different wavelengths.

20. The holographic recording material of claim 18 wherein said first and second photons have the same wavelength.

* * * * *